(12) United States Patent
Pyle et al.

(10) Patent No.: US 6,466,234 B1
(45) Date of Patent: Oct. 15, 2002

(54) METHOD AND SYSTEM FOR CONTROLLING ENVIRONMENTAL CONDITIONS

(75) Inventors: Harry S. Pyle, Bellevue, WA (US); Torsten Gelland, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/322,459

(22) Filed: May 28, 1999

Related U.S. Application Data

(60) Provisional application No. 60/118,668, filed on Feb. 3, 1999.

(51) Int. Cl.$^7$ ................................................. G06F 3/00
(52) U.S. Cl. .................. 345/771; 345/765; 345/767; 345/853; 345/854; 345/764; 700/286
(58) Field of Search ........................... 345/700, 764, 345/765, 766, 767, 853, 854, 771, 965, 970, 839; 700/83, 286

(56) References Cited

U.S. PATENT DOCUMENTS

| | | | | |
|---|---|---|---|---|
| 5,295,062 A | * | 3/1994 | Fukushima | 345/188 |
| 5,611,059 A | * | 3/1997 | Benton et al. | 345/700 |
| 5,859,885 A | * | 1/1999 | Rusnica et al. | 376/259 |
| 5,896,138 A | * | 4/1999 | Riley | 345/440 |
| 5,945,993 A | * | 8/1999 | Fleischmann | 345/764 |
| 6,219,046 B1 | * | 4/2001 | Thomas et al. | 345/705 |

* cited by examiner

*Primary Examiner*—Raymond J. Bayerl
*Assistant Examiner*—Cuong T. Thai
(74) *Attorney, Agent, or Firm*—Woodcock Washburn LLP

(57) ABSTRACT

A method and system for controlling environmental conditions, such as lighting. The lighting system provides an architecture that includes a scene description data structure. A scene defines one or more circuits and a target state for the lights on those circuits. The scene description data structure specifies circuits within a scene and specifies a target state for the lights on those circuits within a scene. The lighting system provides a lighting gateway that retrieves and provides scene descriptions to assist in generating a user interface for enabling scenes, and that receives requests to enable scenes and then requests a lighting controller to enable the target state for each circuit within the scene. Each space (e.g., area or room) within the environment has a lighting component that provides a standard programmatic interface to the control the lights from a space. The lighting component retrieves scene descriptions from the lighting gateway and receives requests from a user control point device to enable a scene and then forwards the requests to the lighting gateway.

41 Claims, 7 Drawing Sheets

Scene Description Table

| Scene Id | target intensity | change Time | Scene Name | Circuit Ids | Event |
|---|---|---|---|---|---|
| 0 | 75 | 2 | Rec Room Dim | 100, 101, 102 | "Lights Dim" |
| 1 | 100 | 5 | Rec Room Bright | 100, 101, 102 | |
| 2 | 0 | 1 | Rec Room Off | 100, 101, 102 | "Lights Off" |
| 3 | 25 | 3 | TV Room View | 50, 51 | |
| 4 | 0 | 3 | TV Room Off | 52, 53 | |
| 5 | 25 | 3 | Hall View | 60 | |

Scene Description Table

Fig. 3

| Scene Id | target intensity | change Time | Scene Name | Circuit Ids | Event |
|---|---|---|---|---|---|
| 0 | 75 | 2 | Rec Room Dim | 100, 101, 102 | "Lights Dim" |
| 1 | 100 | 5 | Rec Room Bright | 100, 101, 102 | |
| 2 | 0 | 1 | Rec Room Off | 100, 101, 102 | "Lights Off" |
| 3 | 25 | 3 | TV Room View | 50, 51 | |
| 4 | 0 | 3 | TV Room Off | 52, 53 | |
| 5 | 25 | 3 | Hall View | 60 | |

Group Table

| Group Id | Group Name | Scene Ids |
|---|---|---|
| 0 | Rec Room | 0, 1, 2 |
| 1 | TV Room | 3, 4 |
| 2 | Hall | 5 |

Fig. 4

Space/Group Table

| Space | Groups |
|---|---|
| TV Room | 1, 2 |
| Hall | 1, 2 |
| Rec Room | 0, 2 |
| . | . |
| . | . |
| . | . |

Fig. 5

METHOD AND SYSTEM FOR CONTROLLING ENVIRONMENTAL CONDITIONS

CROSS-REFERENCE TO RELATED APPLICATIONS

This application is related to U.S. Patent Application No. 60/118,668, entitled "COMMON DISTRIBUTED OBJECT PLATFORM," filed on Feb. 3, 1999; U.S. patent application Ser. No. 09/322,455, entitled "METHOD AND SYSTEM FOR TRACKING SOFTWARE COMPONENTS," filed on May 28, 1999; U.S. patent application Ser. No. 09/322,962, entitled "METHOD AND SYSTEM FOR TRACKING CLIENTS," filed on May 28, 1999; U.S. patent application Ser. No. 09/322,643, entitled "AUDIO VISUAL ARCHITECTURE," filed on May 28, 1999; U.S. patent application Ser. No. 09/322,207, entitled "METHOD AND SYSTEM FOR DISTRIBUTING ART," filed on May 28, 1999; U.S. patent application Ser. No. 09/322,964, entitled "METHOD AND SYSTEM FOR GENERATING A USER INTERFACE FOR DISTRIBUTED DEVICES," filed on May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999, the disclosures of which are incorporated herein by reference.

TECHNICAL FIELD

The described technology relates generally to a system for controlling environmental conditions and, more particularly, to a computer system architecture for controlling the environmental conditions.

BACKGROUND

A large environment, such as an office building, a factory, or a large house, may have many environmental conditions that can be controlled. These environmental conditions may include lighting, room temperature, ventilation, other environmental conditions that may be electrically controlled, and so on. For example, such a large environment may have hundreds or thousands of lights that can be turned on or off or placed in an intermediate state using a dimmer. Multiple lights within such an environment may be wired to a single circuit. All the lights on a single circuit are controllable as a unit and are thus in the same state. For example, all lights on a circuit may be at 50% intensity when a dimmer is used. The lights in such large environments are typically controllable by light switches and a computer system. Light switches may be located throughout the environment in areas near where the lights are located. For example, in a large house, a light switch for controlling lights within the kitchen may be located in the kitchen itself. Computer systems have been developed to control the turning on and turning off of lights within such environments. For example; a computer system that controls the lighting of a building may automatically turn off certain lights at night to conserve energy. These computer systems for controlling lights are generally remotely from the lights and centrally located in that a computer system at one location can control all the lights.

Other environmental conditions also have manual controllers that may be located throughout the environment and a computer system controller that is centrally located. For example, a heating system may have a temperature control device located in each room of a house to control the temperature within the room, and a central heating system controller to control the temperature in any room. A person either sets the temperature for a room at the control device in the room or at the central controller.

The use of only such a locally located controller and a central computer system for controlling the environmental conditions has several disadvantages. For example, a person in one area who would like to control the environmental conditions in an adjacent area would typically either need go to the other area to adjust the environmental conditions or go to the central computer system and request that the computer system change the environmental condition in that other area. Another disadvantage is that the user interface of such a central computer system is typically cumbersome. It may be difficult to browse through and locate the user interface for controlling the desired environmental condition in the desired room. Also, it may be difficult for a user to fully appreciate the effects of the change (e.g., actual level of light intensity) unless that person is actually in the room. It would be desirable to have a technique that would overcome these disadvantages.

SUMMARY

A method and system for controlling environmental conditions is provided. In one embodiment, the environment controlling system provides a lighting system that controls the lighting of the environment. The lighting system provides an architecture that includes a scene description data structure. A scene defines one or more circuits and a target state for the lights on those circuits. The scene description data structure specifies circuits within a scene and specifies a target state for the lights on those circuits within a scene. The lighting system provides a lighting gateway that retrieves and provides scene descriptions to assist in generating a user interface for enabling scenes (i.e., putting the lights of the circuits of the scene in the target state), and that receives requests to enable scenes and then requests a lighting controller to enable the target state for each circuit within the scene. Each space (e.g., area or room) within the environment has a lighting component that provides a standard programmatic interface to control the lights for that space. The lighting component retrieves scene descriptions from the lighting gateway and receives requests from a user control point device to enable a scene and then forwards the requests to the lighting gateway. The lighting system also allows for the specifying of groups of lights within a space. Each user control point device is associated with a primary group of lights. For example, the primary group of lights would typically be the circuits of lights within the room in which the user control point device is located. The lighting system initializes the user control point device to display a user interface for controlling the primary group of lights. A user can request the lighting system to display the user interface for another group of lights at that user control point device. Thus, the lighting system allows lights from multiple spaces to be controlled by a single user control point device located in one space. The lighting system also provides a feedback technique that notifies a user that the lighting controller has been successfully notified to enable a scene as requested by the user.

The environment controlling system also provides an overall architecture for controlling the environmental conditions in a distributed object environment. In one embodiment, a group of environmental conditions is associated with each space. A software component associated with the space provides a software component that is customized to each environmental condition that is related to that space. The software components provide an interface between a user interface component and an environmental gateway. The user interface component provides a user interface for controlling and viewing the environmental conditions. The environmental gateway receives commands for each of the associated software components and controls the environmental conditions through an environmental controller. In one embodiment, each environmental gateway controls one type of environmental condition.

BRIEF DESCRIPTION OF THE DRAWINGS

FIG. 3 illustrates a scene description table.

FIG. 4 illustrates a group table.

FIG. 5 illustrates a space/group table.

DETAILED DESCRIPTION

A method and system for controlling environmental conditions in an environment is provided. The environmental controlling system in one embodiment provides an architecture that allows environmental conditions to be controlled from a user control point device, such as a touch panel display. When the environmental controlling system controls lights, a lighting system allows for scenes to be defined which specify the state of lights controlled by that scene. A scene is a collection of circuits with a target state for the lights on those circuits. For example, a scene may include all the circuits within a room and may specify that the target state is to put the lights on those circuits at high intensity. Another scene may specify only a portion of the circuits within a room and indicate a target intensity that is low. To assist a user in selecting a scene to be enabled, the lighting system displays a visual indication of each possible scene on a user control point device. When the user selects one of visual indications, the lighting system requests a lighting controller to put each of the circuits of the scene into the target state of the scene. Each scene may also specify the transition time or change time that it should take to transition from the current state of the lights to the target state. The lighting system allows for the control of lights in rooms other than the room in which the user control point device is currently located. In addition, the lighting control system provides feedback when the lighting system has successfully notified the lighting controller that a Scene is to be enabled.

The environmental controlling system provides an architecture that includes an environmental gateway, an environmental component, and a user interface component. The environmental gateway interfaces with an environmental controller and forwards requests from the environmental component to the environmental controller. The environmental component receives requests from its user interface components to adjust the environmental condition and forwards those requests to the environmental gateway. The user interface module provides a user interface that allows a user to select a setting for a condition (e.g., a certain temperature) and then forwards that request to the environmental component.

Figure 1:
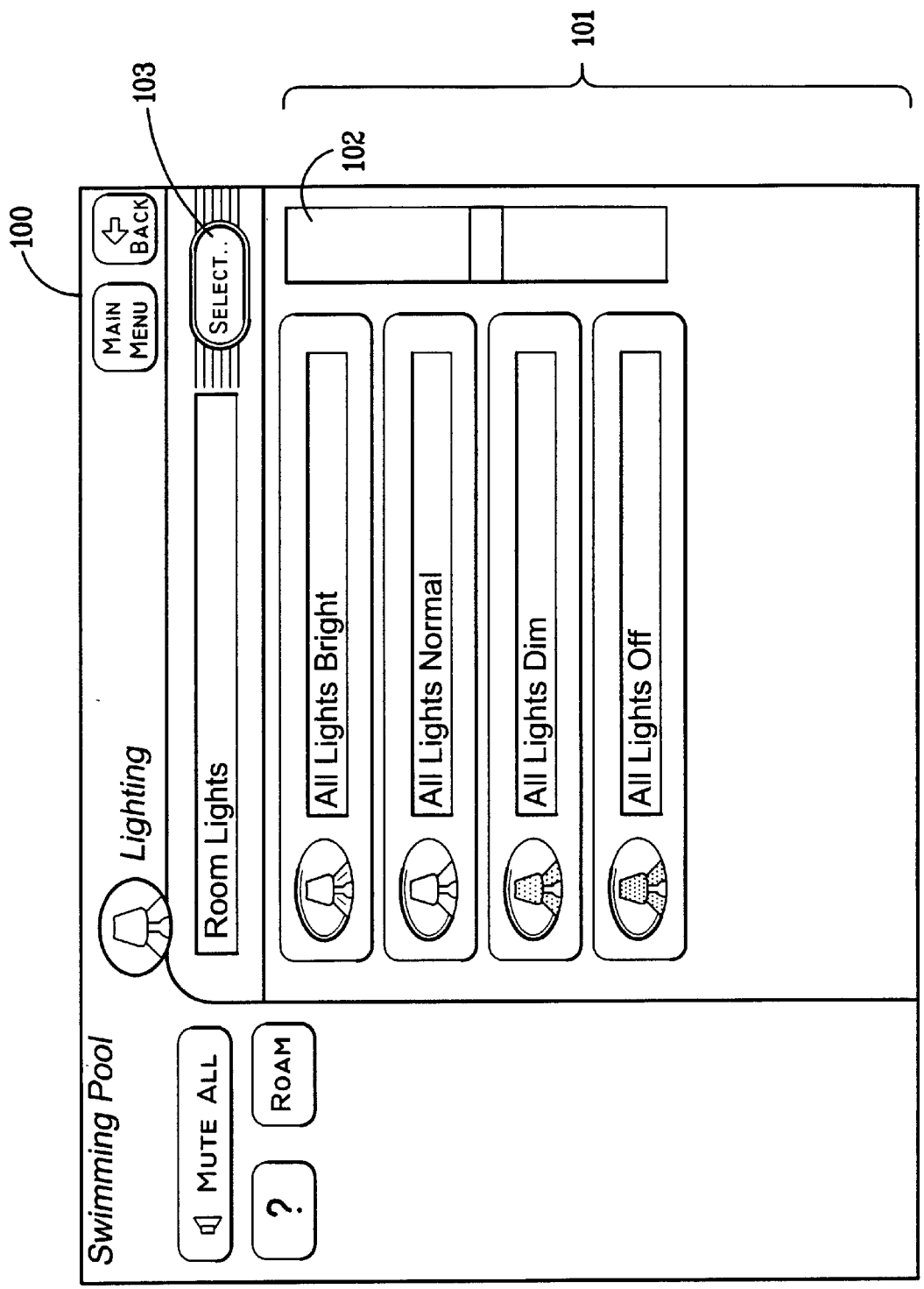
FIG. 1 illustrates the display of a user control point device for controlling lights in one embodiment.

FIG. 1 illustrates the display of a user control point device for controlling lights in one embodiment. The display 100, which may be a touch-sensitive device, includes a lighting panel 101. This display indicates that the user control point device is currently accessing the services associated with the swimming pool space. The display indicates that the user interface for the service associated with the lighting system is currently displayed. Other services may include controlling a stereo system or controlling a heating system. The lighting panel indicates that the "pool lights" can be controlled from the panel. The panel displays a visual indication of each scene that is defined for the swimming pool space. In this example, four scenes are defined for the space, which are "All Lights Bright," "All Lights Normal," "All Lights Dim," and "All Lights Off." When a user selects a visual indication of a scene by, for example, touching the visual indication, the lighting system causes the lights of the circuits of that scene to be set to the target state. The panel also includes a scroll bar 102 for setting the brightness level of the lights within the space. When selected, the select button 103 displays a list of other spaces whose lights can be controlled from this user control point device. When the user selects another space, the user interface system displays a lighting panel that is appropriate to that space in a format similar to that shown in FIG. 1. In certain situations, it may not be easy to visually represent on the display the current state of all the lights in a space. For example, if one scene for a space includes less than all the circuits in the space (e.g., circuits for controlling the floor lights but not overhead lights) and that scene is enabled, then the state of the lights within the room is a combination of two scenes. The two scenes may be a scene that specifies that all lights in the space to be at high intensity and another scene that specifies that only the floor lights in the space are to be at a low intensity. It may be difficult to visually represent the states of the lights that may be a combination of many scenes. Moreover, the current state of the lights may not be readily apparent to a user when the user is controlling the lights from another space. To assist a user in knowing whether a scene has been enabled, the lighting system provides feedback or acknowledgement to the user after the light controller has been successfully instructed to enable a selected scene. In one embodiment, this feedback may be the momentary or temporary highlighting of the visual indication of the scene on the display. Alternatively, the feedback could be audio.

Figure 2:
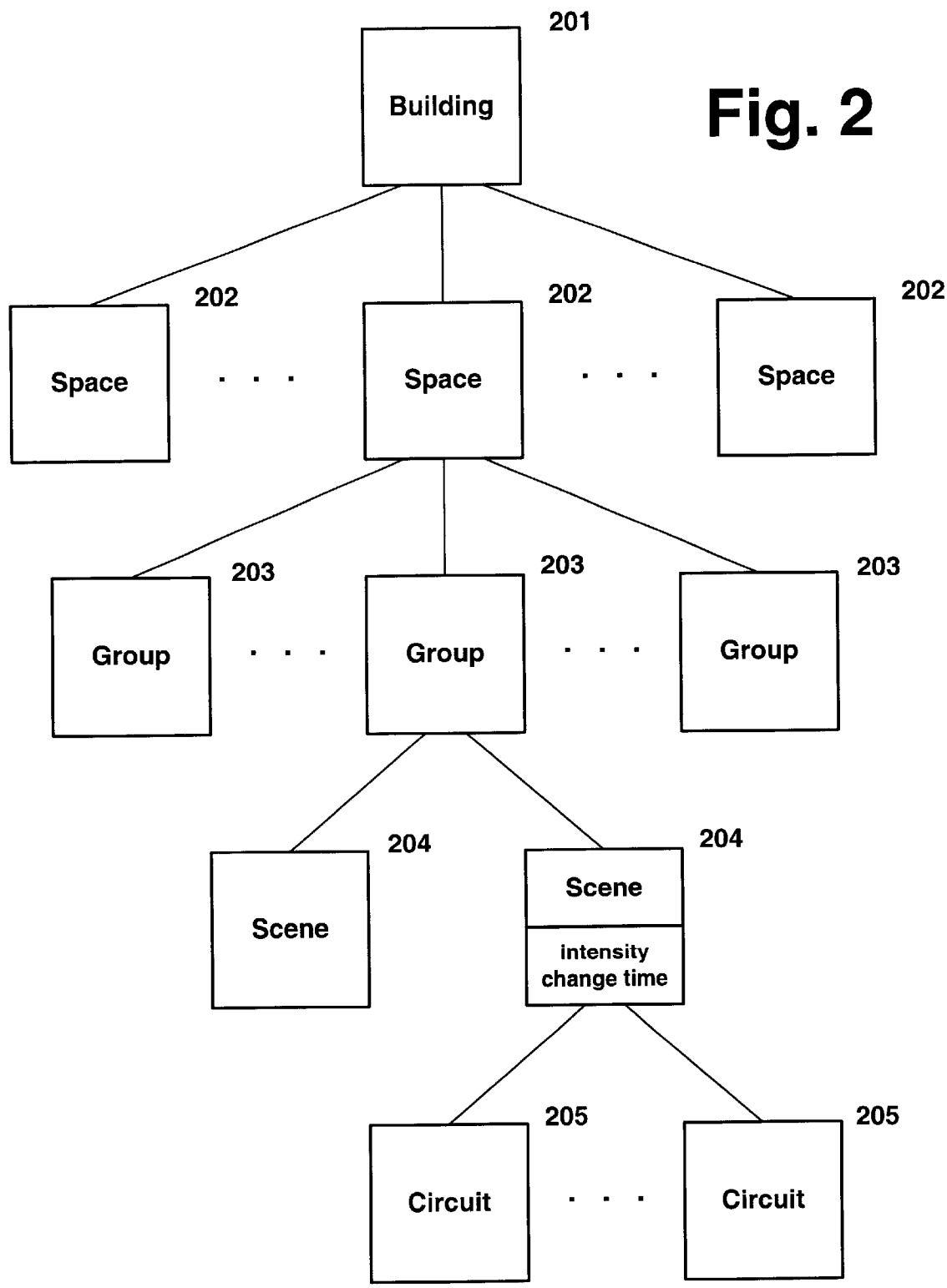
FIG. 2 is a block diagram illustrating the hierarchical relationship of circuits within a building.

FIG. 2 is a block diagram illustrating the hierarchical relationship of circuits within a building. At the top of the hierarchy is a node 201 that represents the building. The building has spaces that are represented by nodes 202. Each space may have multiple groups of associated lights as represented by nodes 203. For example, a media room may have a group that specifies the scenes within the media room and may have a group that specifies scenes within an adjacent room, such as a hall. Also, two spaces, such as a media room and an adjacent hall, may share the same group. Each group may have multiple associated scenes as represented by nodes 204. Each scene may have multiple associated circuits as represented by nodes 205. Each scene also has a target state. For example, a target state may be to set the lights of the circuit to 50% intensity. One skilled in the art will appreciate that the target state may include other visual effects such as automatically varying the intensity of the lights. For example, the visual effect may be the blinking of the lights. In one embodiment, each scene also has an associated change time that indicates the time that it will take to transition the lights from their current state to their target state. For example, if the change time is 3 seconds and the lights are currently at 100% intensity, then when a 50% intensity scene is selected, it will take 3 seconds to transition from 100% to 50% intensity.

FIGS. 3–5 illustrate the data structures that define scenes and groups. These data structures are part of a scene description file. FIG. 3 illustrates a scene description table. The scene description table contains information describing the circuits and target state associated with each scene. In this example, each row of the scene description table corresponds to one scene. Each row contains the scene identifier, the target intensity for the scene, the transition time for the scene, the name of the scene, the identifiers of the circuits within the scene, and an event. For example, the row for the scene with an identifier of "2" indicates that the target intensity is 0, the transition time is 1 second, the scene name is "Rec Room Off," the circuits of the scene are 100, 101, and 102 and the event is "lights off." When a scene is enabled, the corresponding event can be broadcast to notify the various software components of the system. FIG. 4 illustrates a group table. The group table identifies the scenes within a particular group. Each row of the group table corresponds to a single group. Each row includes a group identifier, a group name, and the identifiers of the scenes within that group. For example, the row for the scene with an identifier of "1" indicates that the name of the group is "TV Room" and that the identifiers of the scenes within that group are 3 and 4. FIG. 5 illustrates a space/group table. The space/group table contains information describing the groups that are accessible from a given space. Each row of the space/group table corresponds to one space. Each row contains the name of the space and the identifiers of the groups within the space. For example, the row for the space with the name of "Hall" indicates that groups 1 and 2 are associated with that space. The space/group table may also indicate which group is the primary group for the space.

Figure 6:
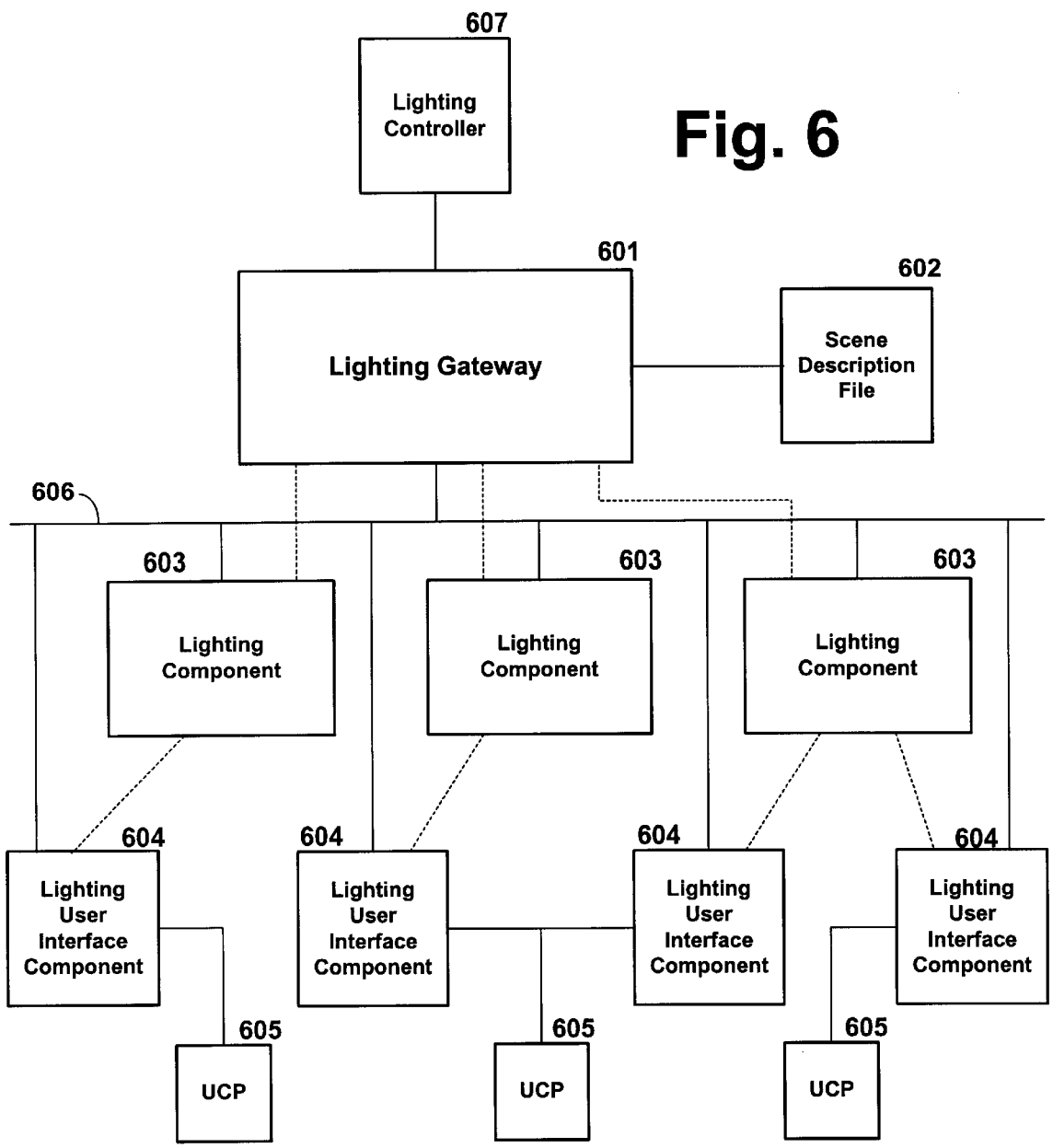
FIG. 6 is a block diagram illustrating the overall architecture of the lighting system.

FIG. 6 is a block diagram illustrating the overall architecture of the lighting system. The lighting system may be implemented in a distributed computer system. Each computer may include a central processing unit, a memory, and input/output devices. The components of the lighting system may be implemented in software and use data structures that are stored on a computer-readable medium and that can be transmitted via a computer-readable data transmission medium. The lighting system includes a lighting gateway 601, a scene description file 602, lighting components 603, and lighting user interface components 604. The lighting user interface components interact with the user control point devices 605. The various components may execute on different computers and may be interconnected via communications channel 606. The communications channel may be a logical interconnection between components on the same computer. The dashed lines indicate which components directly communicate with each other. For example, a lighting user interface component communicates directly with a lighting component. The lighting gateway controls the lighting controller 607. The lighting controller provides the interface between the lighting system and the switching mechanism for the lights. The lighting gateway provides three primary services. First, it provides access to the scene description file, which includes the scene description table, the group table, and the space/group table. Second, it receives requests to enable a scene, retrieves the circuit information for that scene from the scene description file, and then instructs the lighting controller to place the circuits of that scene in the target state. Third, the lighting gateway may send out a notification when the lighting controller becomes available or unavailable. The lighting components, one for each space, provide a programmatic interface for receiving requests to control lighting and to instruct the lighting gateway accordingly. The lighting user interface components are provided by the lighting components in one embodiment and serve as the interface between the user control point device and lighting components. The lighting user interface components are responsible for generating the user interface appropriate to control the lighting. In one embodiment, the components may be implemented as objects in the object-oriented sense. The lighting user interface component initially generates a display of the scenes that are available to control the lighting within the space associated with the lighting user interface component. The lighting user interface component retrieves the groups associated within the space from a lighting component, which in turn, retrieves the group associations from the lighting gateway. When a user selects a scene, the lighting user interface component requests the lighting component to enable the scene, which in turn passes the request to the lighting gateway, which instructs the lighting control to enable that scene. After the lighting controller has been successfully instructed, the lighting user interface component may provide feedback to the user. One skilled in the art will appreciate that the overall architecture of the lighting system can be used to control other environmental conditions. The concepts of a scene, however, may not be applicable when controlling some environmental conditions other than lighting.

Figure 7:
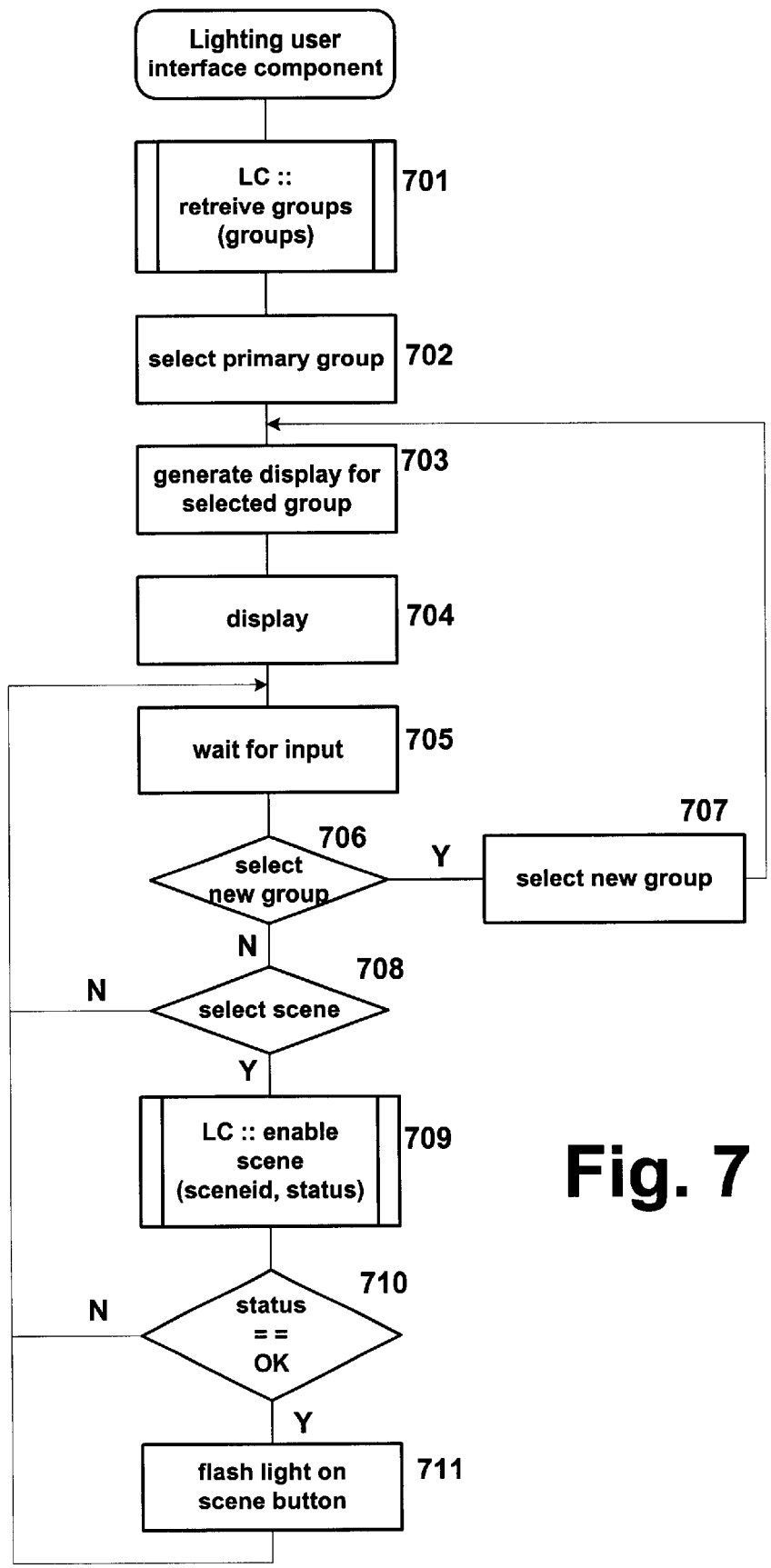
FIG. 7 is a flow diagram of the processing performed by the lighting user interface component in one embodiment.

FIGS. 7–11 are flow diagrams illustrating example processing of components of the lighting system. FIG. 7 is a flow diagram of the processing performed by the lighting user interface components in one embodiment. The lighting user interface components generate displays for controlling the lighting, receive requests from users to enable scenes, and forward the requests to the associated lighting component. In step 701, the component invokes the retrieve groups function of the lighting component to retrieve the groups associated with the space of the user control point device. In step 702, the component selects the primary group for the space, which may be the first group in a list of groups. In steps 703–711, the component loops displaying the user interface for the currently selected group and directing the lighting component to enable scenes selected by a user. In step 703, the component generates a display for the selected group. In step 704, the component displays the generated display. In step 705, the component waits for user input. In step 706, if the input is the selection on the new group, then the component continues at step 707, else the component continues at step 708. In step 707, the component selects the new group and loops to step 703 to display the user interface for the group. In step 708, if the input is the selection of a scene, then the component continues at step 709, else the component loops to step 705 to wait for other user input. In step 709, the component invokes the enable scene function of the lighting component passing the identifier of the scene and receiving a status in return. The status indicates whether the scene enabling instructions were successfully communicated to the lighting controller. If the lighting controller is for some reason off line or if an error is detected when invoking the functions of the components, then an error is returned. In step 710, if the status is okay, then the component continues at step 711, else the component loops to step 705 to wait for user input. In step 711, the component outputs a momentary acknowledgement that the scene was successfully enabled. In one embodiment, the acknowledgement is the momentary highlighting of the visual indication of the scene on the user control point device. The component then loops to step 705 to wait for user input.

Figure 8:
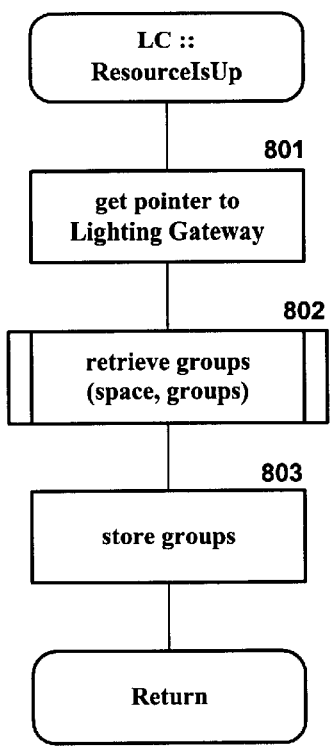
FIG. 8 is a flow diagram of a resource is up function of the lighting component ("LC").

FIG. 8 is a flow diagram of a resource is up function of the lighting component ("LC"). This function is invoked when the lighting gateway enters the up state, that is when it can receive requests to control the lights. The function retrieves the groups of scenes associated with the space. Each lighting component is configured to be associated with a space. In step 801, the function retrieves a pointer to the lighting gateway. In step 802, the function invokes the retrieve groups function of the lighting gateway passing an indication of the space and receiving the groups for that space in return. In step 803, the function stores the retrieved group information so that information can be provided when requested by the lighting user interface components. The function then returns.

Figure 9:
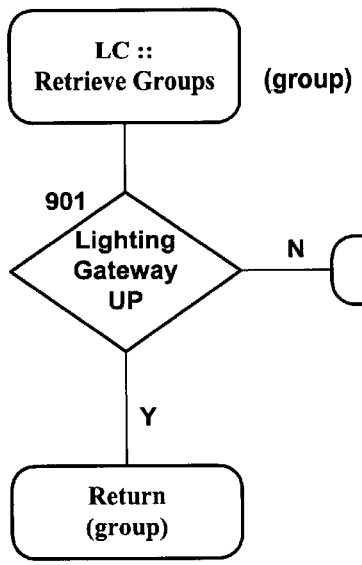
FIG. 9 is a flow diagram of a function for retrieving groups from the lighting component.

FIG. 9 is a flow diagram of a function for retrieving groups from the lighting component. This function returns the group information that was previously provided by the lighting gateway. In step 901, if the lighting gateway is currently up, then the function retrieves and returns the group information that was previously stored. Otherwise, the function returns an error.

Figure 10:
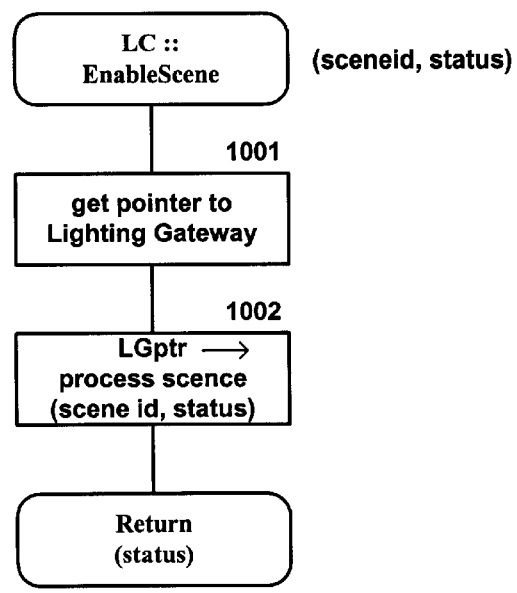
FIG. 10 is a flow diagram of an enable scene function of the lighting component.

FIG. 10 is a flow diagram of an enable scene function of the lighting control interface component. The function is passed a scene identifier, instructs the light gateway component to enable the scene, and returns a status indicator. In step 1001, the function retrieves a pointer to the lighting gateway. In step 1002, the function invokes the enable scene function of the lighting gateway passing the scene identifier and receiving the status in return. The function then returns with that status.

Figure 11:
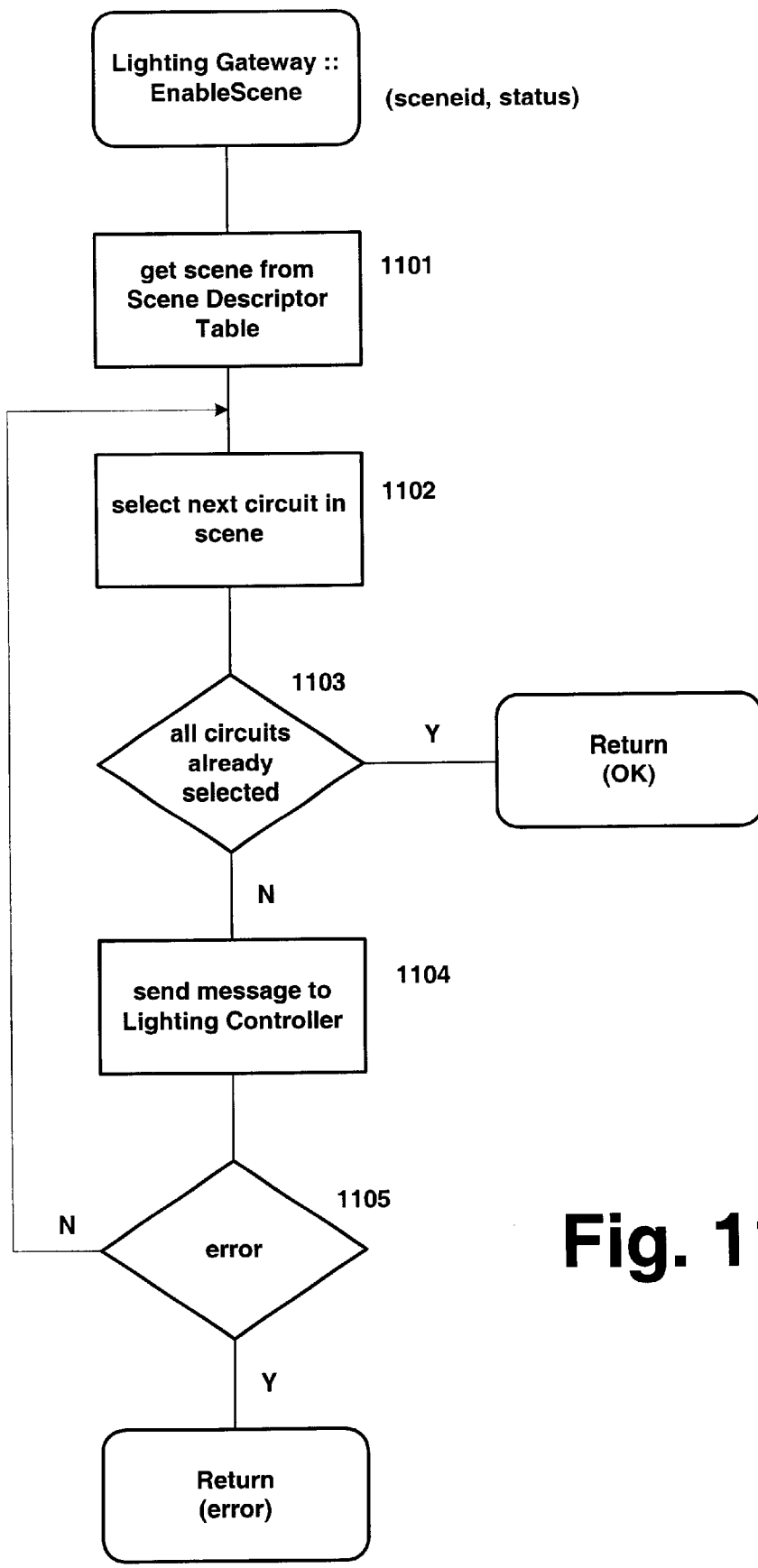
FIG. 11 is a flow diagram of the enable scene function of the lighting gateway.

FIG. 11 is a flow diagram of the enable scene function of the lighting gateway. This function is passed a scene identifier, directs the lighting controller to place the lights of the circuits of that scene in their target state, and returns the status. In step 1101, the function retrieves the information for the scene from the scene descriptor table. In steps 1102–1105, the function loops selecting each circuit in the scene and directing the lighting controller to put the circuit in its target state. In step 1102, the function selects the next circuit in the scene. In step 1103, if all circuits have already been selected, then the function returns a status of okay, else the function continues at step 1104. In step 1104, the function sends a message to the lighting controller to put the selected circuit in the target state. In step 1105, if an error occurs in sending the message to the lighting controller, then the function returns an error, else the function loops to step 1102 to select the next circuit in the scene.

Although specific embodiments of, and examples of, the present invention are described for illustrative purposes, it is not intended that the invention be limited to these embodiments. Equivalent methods, structures, processes, steps, and other modifications within the spirit of the invention are within the scope of the invention. For example, in one embodiment, the lighting gateway may download a description of the scenes to the lighting controller. Thus, whenever the lighting gateway receives a request to enable a scene, it can check a local cache to determine whether the scene is valid. If the scene is valid, the lighting gateway requests the lighting controller to enable the scene. Otherwise, the lighting gateway reports an error. An environmental controlling system can use a spatial hierarchy for controlling environmental conditions in a manner that is analogous to controlling the displaying of images as described in the U.S. Patent Application entitled "Method and System for Distributing Art." An environmental controlling system may be implemented using the techniques and facilities described in the U.S. Patent Application entitled "Method and System for Tracking Software Components." Accordingly, the invention is not limited to the specific embodiments but instead the scope of the invention is specified by the following claims.

What is claimed is:

1. A computer system for controlling lights within an environment, each light being on a circuit, comprising:
    a scene description data structure that specifies circuits within a scene and specifies target states for the circuits within a scene;
    a lighting gateway that retrieves and provides scene descriptions from said scene description data structure when requested and that receives requests to enable a scene and notifies a lighting controller to enable the target state for each circuit within the scene that is requested to be enabled; and
    a lighting component for each space from which lights can be controlled that requests and retrieves the scene descriptions from the lighting gateway and that receives requests generated from a user control point device to enable a scene and forwards the request to the lighting gateway.

2. The computer system of claim 1 further including:
    a lighting user interface component for each space that requests the lighting component for scene descriptions and that controls the user control point device to present a user interface for controlling the lights within the space.

3. The computer system of claim 1 wherein the lighting gateway notifies the lighting component when the lighting controller changes state.

4. The computer system of claim 1 wherein the scenes for a space are organized into a group and wherein a user can control scenes in multiple groups from a single control point device.

5. A method in a computer system for controlling lights through a lighting controller, each light being on a circuit, the circuits being organized into scenes, the method comprising:
    displaying a visual representation of scenes within a space that can be controlled, wherein each scene of the scenes has associated therewith a scene description data structure that specifies circuits within the scene and specifies target states for the circuits within the scene;
    receiving a selection of one of the scenes from a user; and
    in response to receiving the selection of a scene,
        requesting the lighting controller to enable the selected scene; and
        when the lighting controller has been successfully requested, displaying a momentary feedback to the user indicating that the lighting controller has been successfully requested.

6. The method of claim 5 wherein the momentary feedback is highlighting of the visual representation of the selected scene.

7. The method of claim 5 wherein the momentary feedback is an audio feedback.

8. The method of claim 5 including:
when the lighting controller has not been successfully requested, suppressing the displaying of the momentary feedback.

9. The method of claim 5 wherein the scenes can be enabled as a result of user input from any of more than one user control point device.

10. The method of claim 5 wherein a scene controls less than all of the circuits within a space.

11. A computer readable medium comprising computer executable instructions for performing the method of claim 5.

12. A modulated data signal carrying computer executable instructions for performing the method of claim 5.

13. A computing device comprising means for performing the method of claim 5.

14. A method for controlling an environmental condition in an environment having a plurality of scenes and a plurality of user control point devices, wherein a scene is a collection of scene component descriptors, wherein each scene component descriptor at least identifies a circuit and a target state for the circuit, comprising:
receiving a selection of a scene of the plurality of scenes from a user control point device of the plurality of user control point devices;
in response to said receiving, requesting a circuit controller to place each of the circuits identified by the corresponding scene component descriptors of the scene at the target state for the scene; and
receiving from the circuit controller a notification when the circuits of the scene have been driven to the target state.

15. A method according to claim 14, wherein a scene component descriptor further includes an associated time to reach the target state for the circuit identified, and wherein said requesting includes requesting the circuit controller to place each of the circuits of the scene into the respective target states for the scene over the time periods specified by the respective times to reach associated with the scene descriptor components.

16. A method according to claim 14, wherein the user control point device is a touch panel display.

17. A method according to claim 14, wherein the environmental condition is at least one of lighting and heating.

18. A method according to claim 14, wherein the user control point device displays a plurality of visual indications corresponding to each possible scene.

19. A method according to claim 14, wherein the target state is one of no lighting, dim lighting, normal lighting, bright lighting, blinking lighting and a temperature.

20. A method according to claim 14, further comprising in response to said receiving, receiving from the circuit controller an indication of the current state of the circuits.

21. A method according to claim 14, further comprising rendering the notification on the user control point device to assist a user in knowing whether the scene has been enabled.

22. A method according to claim 21, wherein said rendering includes at least one of providing a visual indication relating to the scene on a display of the user control point device and providing audio feedback.

23. A method according to claim 14, wherein the target state may include an effect including automatic variation of an intensity of a circuit and a repeated turning off and on of the circuit.

24. A computer readable medium comprising computer executable instructions for performing the method of claim 14.

25. A modulated data signal carrying computer executable instructions for performing the method of claim 14.

26. A computing device comprising means for performing the method of claim 14.

27. An environmental control system for controlling an environmental condition of an environment, including:
an environmental gateway;
an environmental controller;
an environmental component having associated therewith at least one user interface component,
wherein the environmental gateway interfaces with the environmental controller and operates to forward requests from the environmental component to the environmental controller, wherein the environmental component receives requests from its associated at least one user interface component to adjust the environmental condition and forwards those requests to the environmental gateway, and
wherein the environmental condition has associated therewith an environmental condition description data structure that specifies circuits that relate to the environmental condition and specifies target states for the circuits to achieve said environmental condition.

28. An environmental control system according to claim 27, wherein at least one of said environmental gateway, said environmental controller and said environmental component having associated therewith at least one user interface component are co-located.

29. An environmental control system according to claim 27, wherein the at least one user interface component allows a user to select a setting for an environmental condition and forwards the selection to the environmental component.

30. An environmental control system according to claim 29, wherein the at least one user interface component includes a range input portion enabling a position from a range to be input for the selection of the setting.

31. An environmental control system according to claim 30, wherein the range input portion is a scroll bar for setting the environmental condition within the range.

32. A scene description data structure utilized in connection with the setting of a collection of circuits of a scene to related target states, comprising for each of a plurality of scenes described by the data structure:
an identification of the scene;
at least one identification corresponding to each of the circuits within the scene;
a target state for each of the circuits of the scene; and
an event.

33. A scene description data structure according to claim 32, further comprising for each of a plurality of scenes described by the data structure:
a transition time for each of the circuits within the scene.

34. A scene description data structure according to claim 32, further comprising for each of a plurality of scenes described by the data structure:
a name of the scene.

35. An environmental control system for a distributed computing environment, comprising:
a communications bus;
an object controller for controlling a plurality of objects;
an object gateway, wherein said object gateway controls is communicatively coupled to said object controller for communicating information to said object controller from any of multiple components of the system;
a scene description data structure, wherein said scene description data structure is accessible by said object gateway for retrieving descriptions of a scene, wherein a scene is a collection of scene component descriptors, wherein each scene component descriptor at least identifies a circuit and a target state for the circuit;

at least one object component, wherein the at least one object component provides a programmatic interface for receiving requests to control an environmental condition and for instructing the object gateway accordingly;

at least one user control point device for rendering a interface to a user for inputting a scene to enable; and at least one user interface component, wherein the at least one user interface component serves as the interface between the at least one user control point device and the at least one object component and wherein the at least one user interface component generates the data for display on said user control point device, wherein said communications bus interconnects said object gateway, said at least one object component and said at least one object user interface component.

36. An environmental control system according to claim 35, wherein the objects include at least one of a circuit object, a hardware object and an object implemented in software that uses data structures that are stored on a computer-readable medium.

37. An environmental control system according to claim 35, wherein the object gateway at least one of (1) provides access to the scene description data structure, (2) receives requests to enable a scene, retrieves the object information for that scene from the scene description data structure and instructs the object controller to place the objects of that scene in the target state for the scene and (3) sends out a notification when the object controller becomes one of available and unavailable.

38. An environmental control system according to claim 35, wherein the scene description data structure includes a scene description table, a group table, and a space/group table.

39. An environmental control system according to claim 35, wherein an object user interface component of the at least one object user interface component initially generates data representative of a display of the scenes that are available to control the objects within the space associated with the object user interface component.

40. An environmental control system according to claim 35, wherein when a user selects a scene via a user control point of the at least one at least one user control point device, the object user interface component associated with the user control point device requests the object component associated with the object user interface component to enable the scene, which object component in turn passes the request to the object gateway, which instructs the object controller to enable the scene.

41. An environmental control system according to claim 35, wherein the object is one of an object associated with a light and an object associated with a heating device.

* * * * *

UNITED STATES PATENT AND TRADEMARK OFFICE
CERTIFICATE OF CORRECTION

PATENT NO. : 6,466,234 B1
DATED : October 15, 2002
INVENTOR(S) : Harry Pyle et al.

It is certified that error appears in the above-identified patent and that said Letters Patent is hereby corrected as shown below:

Column 1,
Line 57, delete ";" and insert -- , -- therefor;

Column 3,
Line 63, delete "Scene" and insert -- scene -- therefor;

Column 11,
Line 10, delete "a" and insert -- an -- therefor.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,466,234 B1  
DATED : October 15, 2002  
INVENTOR(S) : Harry Pyle et al.

It is certified that error appears in the above-identified patent and that said Letters Patent is hereby corrected as shown below:

<u>Title page,</u>
Item [56], References Cited, insert the following U.S. PATENT DOCUMENT:
-- 5,086,385    2/1992  Launey et al.    364    188 --
OTHER PUBLICATIONS, insert the following publications:
-- Custom Solutions Inc., "Home Vision-PC Owner's Manual, Version 2.62,"
  *Online!*, 1996
  Douligeris et al., "A Platform for a Home Automation Application Layer
  Design," *International Joural of Mini and Microbomputers, 18*(1),: 51-60, 1996
  Wacks, "International Model of a Lighting Control System," *Online!*, 1998 --

<u>Column 1,</u>
Line 57, delete ";" and insert -- , -- therefor;

<u>Column 3,</u>
Line 63, delete "Scene" and insert -- scene -- therefor;

<u>Column 11,</u>
Line 10, delete "a" and insert -- an -- therefor.

This certificate supersedes Certificate of Correction issued January 21, 2003.

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,466,234 B1
DATED        : October 15, 2002
INVENTOR(S)  : Harry S. Pyle et al.

It is certified that error appears in the above-identified patent and that said Letters Patent is hereby corrected as shown below:

<u>Title page,</u>
Item [73], delete "Microsoft Corporation, Redmond, WA (US)" and insert
-- William H. Gates, III, Medina, WA (US) -- therefor;

Signed and Sealed this

Twenty-fourth Day of June, 2003

JAMES E. ROGAN
*Director of the United States Patent and Trademark Office*